(12) United States Patent
Lamirand et al.

(10) Patent No.: US 10,753,258 B2
(45) Date of Patent: Aug. 25, 2020

(54) CORROSIVE FLUID HEATER, TANK AND MANUFACTURING METHOD

(71) Applicant: AKWEL SA, Champfromier (FR)

(72) Inventors: Yves Lamirand, Bourg de Péage (FR); Sylvain Jaquet, Chatuzange le Goubet (FR)

(73) Assignee: AKWEL SA, Champfromier (FR)

( * ) Notice: Subject to any disclaimer, the term of this patent is extended or adjusted under 35 U.S.C. 154(b) by 0 days.

(21) Appl. No.: 15/883,665

(22) Filed: Jan. 30, 2018

(65) Prior Publication Data

US 2018/0223715 A1    Aug. 9, 2018

(30) Foreign Application Priority Data

Feb. 6, 2017    (FR) ...................................... 17 50959

(51) Int. Cl.
*F01N 3/28* (2006.01)
*C25D 11/04* (2006.01)
(Continued)

(52) U.S. Cl.
CPC .......... *F01N 3/2896* (2013.01); *C25D 11/022* (2013.01); *C25D 11/04* (2013.01); *F01N 3/208* (2013.01); *F01N 3/2066* (2013.01); *H05B 3/12* (2013.01); *F01N 2610/02* (2013.01); *F01N 2610/10* (2013.01); *F01N 2610/1406* (2013.01);
(Continued)

(58) Field of Classification Search
CPC ..... C25D 11/022; C25D 11/04; F01N 3/2066; F01N 3/208; F01N 3/2896; F01N 2610/02; F01N 2610/10; F01N 2610/1406; H05B 3/12; H05B 2203/017; H05B 2203/021; F24H 1/20; Y02T 10/24
See application file for complete search history.

(56) References Cited

U.S. PATENT DOCUMENTS

| | | | |
|---|---|---|---|
| 2005/0205646 A1* | 9/2005 | Cheng ..................... | A47J 36/02 228/101 |
| 2007/0157602 A1* | 7/2007 | Gschwind .............. | B60K 15/00 60/274 |

(Continued)

FOREIGN PATENT DOCUMENTS

| | | |
|---|---|---|
| DE | 10 2013 101 077 A1 | 8/2014 |
| DE | 10 2013 211 237 A1 | 12/2014 |

(Continued)

*Primary Examiner* — Brandon D Lee
(74) *Attorney, Agent, or Firm* — Oliff PLC

(57) ABSTRACT

The object of the invention is a heater of a corrosive fluid comprising at least one heat diffuser having at least a first portion intended to be immersed in a corrosive fluid, and at least a second portion intended to be arranged out of the corrosive fluid, at least one heating block comprising at least one heating member configured to heat the corrosive fluid, said heat diffuser comprising at least one housing in which the at least one heating block is housed at least partially, at least the first portion of the heat diffuser being made of anodized aluminum or of anodized aluminum alloy and is configured to be in direct contact with the corrosive fluid. The object of the invention is also a corrosive fluid tank comprising a heater according to the invention and a method for manufacturing a heat diffuser of the heater according to the invention.

16 Claims, 3 Drawing Sheets

(51) Int. Cl.
*C25D 11/02* (2006.01)
*F01N 3/20* (2006.01)
*H05B 3/12* (2006.01)
*F24H 1/20* (2006.01)

(52) U.S. Cl.
CPC .......... *F24H 1/20* (2013.01); *H05B 2203/017* (2013.01); *H05B 2203/021* (2013.01); *Y02T 10/24* (2013.01)

(56) References Cited

U.S. PATENT DOCUMENTS

2011/0138790 A1* 6/2011 Radillo .................. F01N 3/206
                                                            60/303
2011/0138791 A1* 6/2011 Li .......................... F01N 3/206
                                                            60/303

FOREIGN PATENT DOCUMENTS

| EP | 2 336 513 A2 | 6/2011 |
| EP | 2 336 514 A2 | 6/2011 |
| EP | 2 336 515 A2 | 6/2011 |

* cited by examiner

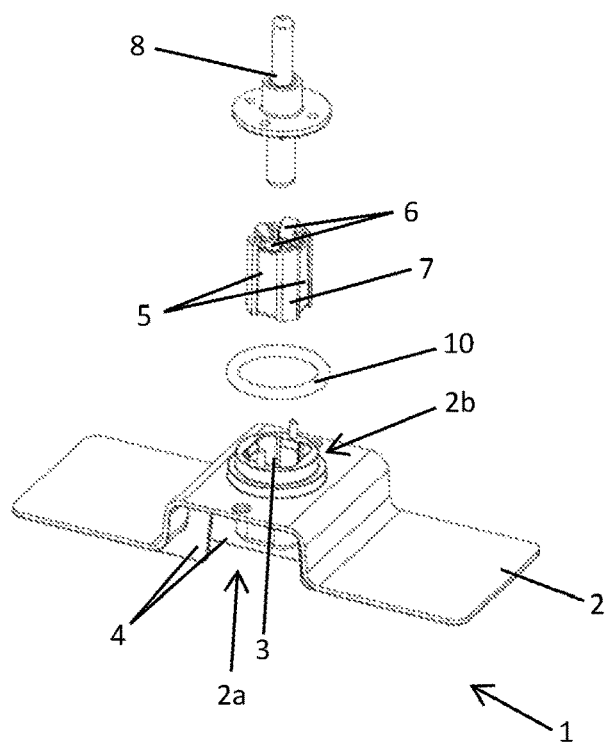
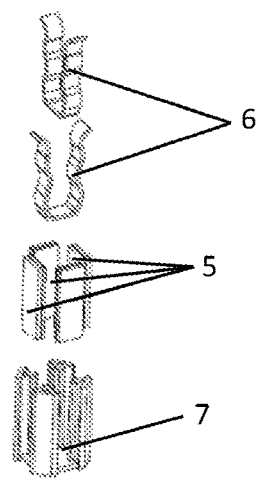
Fig. 3    Fig. 4
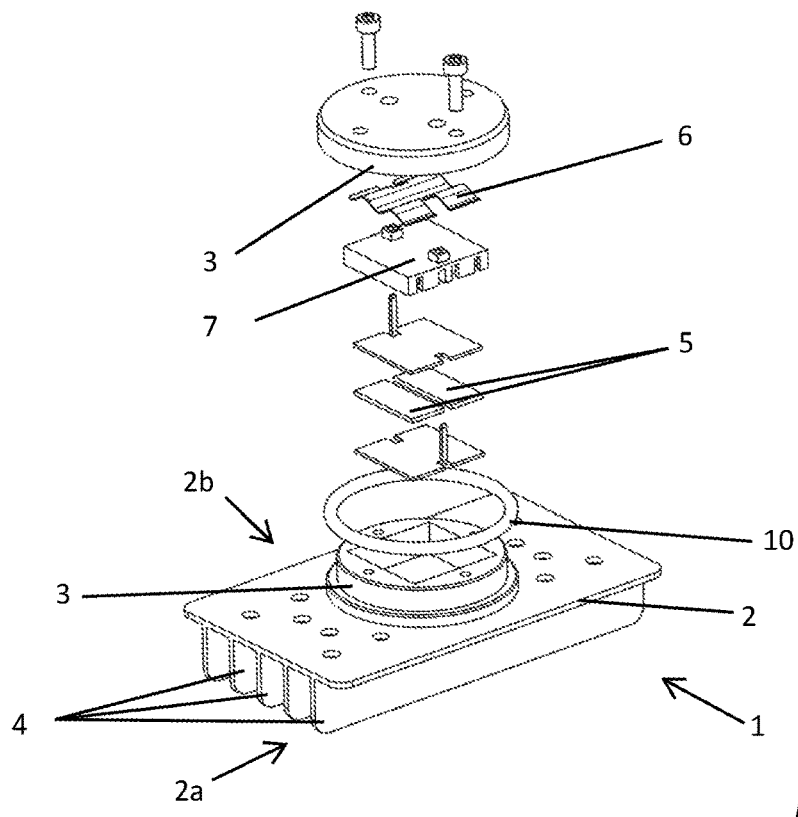
Fig. 5

CORROSIVE FLUID HEATER, TANK AND MANUFACTURING METHOD

TECHNICAL FIELD OF THE INVENTION

The present invention concerns the technical field of systems for storing corrosive fluid, in particular for some metals, for example aluminum or iron. In the present application, the term "corrosive fluid for some metals" means a fluid that can lead to a chemical degradation of these metals in contact with this fluid.

Particularly and for example, the present invention concerns the technical field of systems for storing and pressurizing and/or supplying a solution used in the selective catalytic reduction (SCR) process of motor vehicles, heavy goods vehicles, agricultural machinery and construction machines and machinery. This solution is a diesel exhaust fluid known under the standard designation AUS 32 for "Aqueous Urea Solution" and sometimes commercially known as Adblue®. This solution comprises 32.5% of highly pure urea diluted in demineralized water allowing converting nitrogen oxides $NO_x$, contained in the exhaust gases, into nitrogen and into water vapor, thus reducing the pollutant emissions of vehicles.

BACKGROUND OF THE INVENTION

Generally, the aqueous urea solution is stored in a dedicated tank in the vehicle, which is connected to the selective catalytic reduction system of said vehicle.

In the present invention, the terms "selective catalytic reduction system" mean a system comprising a tank of an aqueous urea solution, a catalyst, an injector of the aqueous urea solution in the exhaust line and at least one pipe connecting the tank to the injector, the catalyst being positioned at the exhaust line downstream of the inlet of the injector so that the catalysis occurs on a mixture of exhaust gas circulating in the exhaust line and of aqueous urea solution injected upstream of the catalyst in said exhaust line.

In a known manner, the aqueous urea solution contained in a storage device of a vehicle tends to freeze around −11° C. Therefore, the aqueous urea solution storage device is generally equipped with a system for heating said solution in order to prevent the latter from freezing.

There are several types of aqueous urea solution heaters. For example, preferentially for heavy goods vehicles, the calories of the engine cooling system are used by means of a stainless steel plunger used as a heat exchanger immersed in the tank. This solution is not yet adopted for light motor vehicles to the extent that the aqueous urea solution tank is located opposite the engine cooling system, which requires piping of considerable length traversing the entire vehicle and consequently cumbersome piping. In addition, making stainless-steel plungers is expensive and complicated.

In addition, there are also heating devices comprising one or more heating member(s), such as resistive tracks or thermistors with a positive temperature coefficient called PTC in the following application, equipped or not with an aluminum heat diffuser for example, the whole being overmolded by a compatible material for an immersion in the aqueous urea solution, such as silicone, polyoxymethylene (POM) or high-density polyethylene (HDPE). These overmolded devices have several drawbacks. Plastic, generally thermoplastic, materials used for the overmolding have generally relatively low melt temperatures, which causes a limitation of the power density of the devices to prevent the overmolding from melting, which leads to an increase in the exchange surfaces and therefore to a high bulk. In addition, the plastic materials used are generally poor heat conductors, which reduces the efficiency of the heaters. Finally, these plastic materials having a coefficient of expansion different from the resistive tracks or diffusers, there is a significant risk of occurrence of cracks, breaks or detachment of the overmolding, thereby making the heater inefficient or even ineffective.

SUMMARY OF THE INVENTION

The Invention aims to overcome all or part of the aforementioned drawbacks.

The object of the invention is a heater of a corrosive fluid for metals, for example of an aqueous urea solution, comprising at least one heat diffuser having at least a first portion intended to be immersed in a corrosive fluid for metals, for example an aqueous urea solution, and at least a second portion intended to be arranged out of the corrosive fluid; at least one heating block comprising at least one heating member configured to heat the corrosive fluid, said heat diffuser comprising at least one housing in which the at least one heating block is housed at least partially, characterized in that at least the first portion of the heat diffuser is made of anodized aluminum or of anodized aluminum alloy and is configured to be in direct contact with the corrosive fluid.

The heater according to the invention has several advantages. Indeed, by using a heat diffuser whose at least first portion is made of anodized aluminum or of anodized aluminum alloy, a plastic overmolding, which slows the heating of the corrosive fluid, is avoided. In addition, possible defects and cracks due to a difference in coefficient of heat expansion are avoided since the heat diffuser is made of mono-material without overmolding. Thus, the heater according to the invention allows combining high heat conduction properties thanks to the use of aluminum and a protection by anodization of this same aluminum against a corrosive fluid that chemically degrades aluminum as, for example, an aqueous urea solution.

In addition, the melting temperature of the aluminum and the cracking temperature of the anodized layer being higher than the melt temperatures of the overmolding materials, it is possible to bring the anodized heater according to the invention to temperatures higher than those commonly used for overmolded heaters, and therefore limit the bulk required by the heater according to the invention.

According to one feature of the invention, the corrosive fluid is an aqueous urea solution.

According to one feature of the invention, the first portion of the heat diffuser is not overmolded with a plastic material.

According to one feature of the invention, the material used for making the heat diffuser may be an aluminum alloy such as A-S9U3 (Fe). Aluminum alloy A-S9U3 (Fe) means an aluminum-silicon alloy with copper designated as A-S9U3 (Fe) which is internationally similar to the A380 alloy in the United States and to the ADC10 alloy in Japan.

According to one feature of the invention, the material used for making the heat diffuser may be an aluminum alloy such as aluminum alloys 6082, 6351, 6063, which are aluminum-magnesium-silicon alloys.

According to one feature of the invention, the material used for making the heat diffuser may be an aluminum alloy such as aluminum alloys 5083, 5754, which are aluminum-magnesium alloys.

Advantageously, the heat diffuser made of one of the anodized aluminum alloys or of anodized aluminum allows obtaining very good corrosion resistance performances in the aqueous urea solution.

According to one feature of the invention, the heating block is in direct contact with the housing of the heat diffuser, that is to say that the heating block is free of overmolding, thus allowing a more effective and a faster heat transmission to the heat diffuser.

According to one feature of the invention, the heating member is a resistive track or a thermistor with a positive temperature coefficient.

According to one feature of the invention, the heating block comprises a plurality of heating members housed in the housing of the heat diffuser.

Preferably, the heating block comprises at least four thermistors with a positive temperature coefficient.

According to one feature of the invention, the heating block comprises one or more fastening and/or holding element(s) configured to hold the heating member(s) in the housing. For example, the fastening and/or holding element is a holding spring.

Preferably, the heating block comprises a support shaped to receive at least partially the heating members and preferably the thermistors with positive temperature coefficient.

According to one feature of the invention, the support is configured to fit at least partially into the housing of the heat diffuser.

According to one feature of the invention, the heater comprises at least one connector element configured to connect the heating member(s) to an electronic board.

According to one feature of the invention, the heating member(s) is/are driven by at least one electronic board.

According to one feature of the invention, the heat diffuser comprises at least one diffusion fin, which allows transferring heat produced by the heating member into the corrosive fluid in an effective manner.

According to one feature of the invention, the fin is arranged on the first portion of the heat diffuser.

Advantageously, the heat diffuser comprises a plurality of diffusion fins distributed over the first portion of the heat diffuser.

According to one feature of the invention, the second portion of the heat diffuser is at least partially non-anodized.

According to one feature of the invention, the housing of the heat diffuser provided for the one or more heating member(s) extends transversely between the first portion of the heat diffuser and the second portion of the heat diffuser. Advantageously, the housing of the heat diffuser extends in a plane secant, preferably substantially perpendicular, to the plane in which the first portion and/or the second portion of the heat diffuser generally extends.

Alternatively, and according to one feature of the invention, the housing of the heat diffuser extends in a plane substantially parallel to the plane in which the first portion and/or the second portion of the heat diffuser generally extends.

Advantageously, the heating block is always implanted in the dry area of the heater.

The object of the invention is also a tank of a corrosive fluid for metals, for example of an aqueous urea solution, the tank comprising: —an internal volume intended to contain a corrosive fluid for metals, for example an aqueous urea solution, said internal volume being delimited by at least one upper wall, one lower wall and one side wall connecting the upper wall and the lower wall, —a drawing orifice shaped to receive a member for drawing the corrosive fluid, —a heater according to the invention, said heater being positioned on one of the walls of the tank, the first portion of the heater of the heat diffuser being arranged in the internal volume of the tank.

According to one feature of the invention, the first portion of the heat diffuser is positioned closer to the drawing orifice, which allows drawing the corrosive fluid at the correct temperature.

Preferably, the first portion of the heat diffuser is positioned on the bottom wall of the tank.

According to one feature of the invention, the second portion of the heat diffuser is arranged at least partially outside the tank.

According to one feature of the invention, the tank comprises a positioning orifice shaped to allow the arrangement of the heater in part in the internal volume of said tank and in part out of the tank.

According to one feature of the invention, the tank comprises a seal arranged at the positioning orifice so that the second portion of the heat diffuser is not in contact with the corrosive fluid contained in the tank.

According to one feature of the invention, said seal is formed in a secured manner to said positioning orifice of the tank or said seal is formed in an independent manner from said positioning orifice of the tank.

According to one feature of the invention, the heater comprises a seal arranged at the positioning orifice of the tank, said seal being formed in a secured manner to said heater or said seal being formed in an independent manner from said heater.

Alternatively, or in addition and according to one feature of the invention, the heat diffuser comprises a seal, which is preferably overmolded on said heat diffuser.

Thus, according to the invention, the seal may be a seal independent of the components of the heater or of the tank or the seal is a seal inseparable from the heat diffuser or from another component of the heater or the tank.

According to a feature of the invention, the connector element of the heater is protruding from the tank and allows connecting the electronic board, which is arranged out of the tank with the one or more heating member(s) housed in the housing of the heat diffuser.

The object of the invention is also a method for manufacturing a heat diffuser of a heater according to the invention, said method comprising a step of making the heat diffuser in an aluminum or aluminum alloy type material and an anodizing step on at least a first portion of said heat diffuser, said first portion being intended to be immersed in an aqueous urea solution.

The anodizing step allows providing the heat diffuser thus formed a good protection against the corrosivity of the aqueous urea solution and makes it possible to dispense with any additional part or material to be added to the heat diffuser to protect it.

Preferably, the anodization carried out in the heat diffuser manufacturing method is a hard anodization. "Hard anodization" means anodization with a sulfuric acid bath, allowing good abrasion resistance and high hardness, this hard anodization is also known as hard anodic oxidation. Alternatively, the anodization carried out in the heat diffuser manufacturing method may be a sulfoboric anodic oxidation or a sulfotartric anodic oxidation or a sulfuric anodic oxidation or a titanium anodic oxidation or a chromic anodic oxidation.

According to one feature of the invention, the manufacturing method comprises an additional clogging step, carried out after the anodizing step.

According to one feature of the invention, the second portion of the heat diffuser intended to be arranged out of the aqueous urea solution, is at least partially free of anodization. Advantageously, the second portion of the heat diffuser is the area by which the heat diffuser is held during anodization.

Advantageously, the heat diffuser is carried out by molding and/or machining and/or brazing and/or welding.

BRIEF DESCRIPTION OF THE DRAWINGS

The invention will be better understood, thanks to the following description, which refers to an embodiment according to the present invention, given by way of non-limiting example and explained with reference to the appended schematic drawings, wherein:

FIG. 3 is an exploded view of the heater according to the invention,

FIG. 4 is an exploded view of a heating block of the heater according to the invention, FIG. 5 is an exploded view of a heater according to a variant.

DETAILED DESCRIPTION OF THE INVENTION

Figure 1:
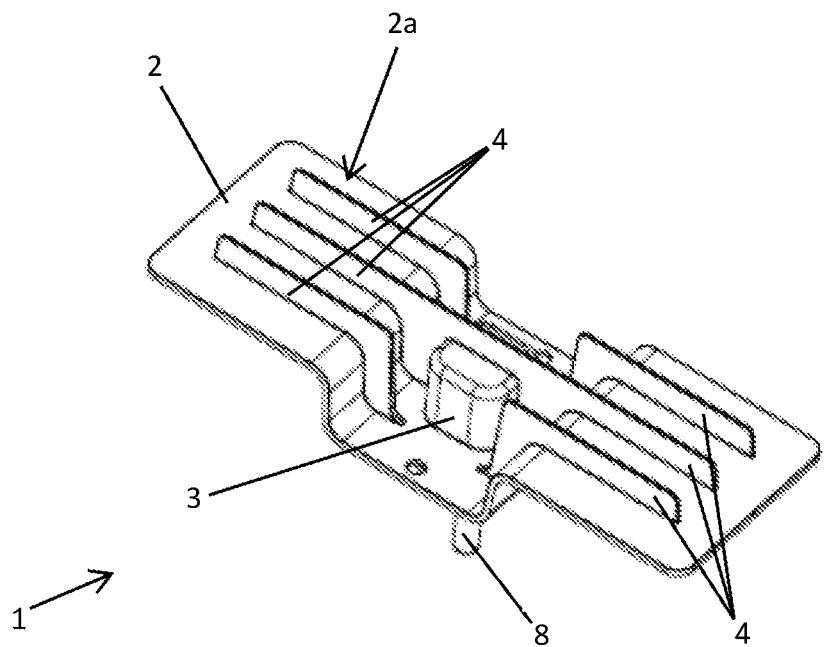
FIG. 1 is a perspective top view of the heater according to the invention.
Figure 2:
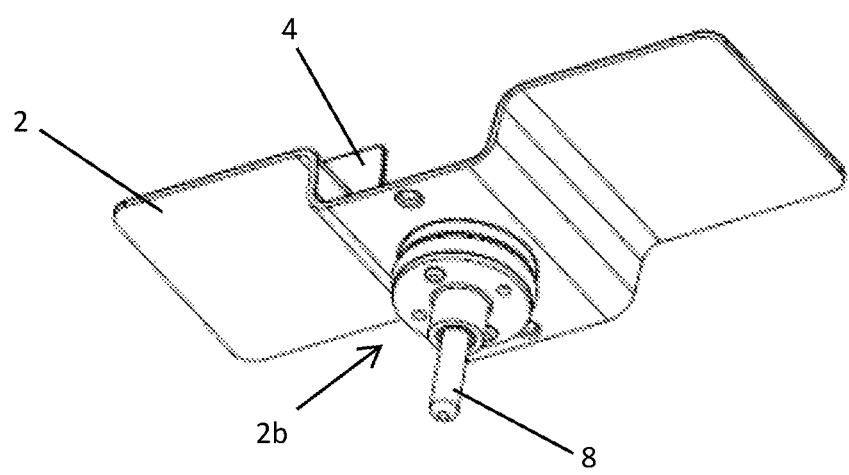
FIG. 2 is a perspective bottom view of the heater shown in FIG. 1.

According to the invention and as illustrated in particular in FIG. 1, the aqueous urea solution heater 1 comprises a heat diffuser 2. The heat diffuser 2 comprises a first portion 2a intended to be immersed in an aqueous urea solution, and a second portion 2b non-anodized and intended to be arranged out of the aqueous urea solution, as represented in FIG. 6. The first portion 2a of the heat diffuser 2 is made of anodized aluminum or of anodized aluminum alloy and is configured to be in direct contact with the aqueous urea solution.

In addition, the heater 1 comprises a housing 3 configured to house at least one heating member 5. Of course, in one variant, the heater may comprise several housings each comprising one or more heating member(s) independent of each other or not.

In the example illustrated in FIG. 3 and in detail in FIG. 4, the heater comprises a plurality of heating members 5 grouped together in a support 7 and held in a housing 3 of the heater 1 by means of two holding springs 6 so to form a heating block. In addition, the heating block is in direct contact with the housing 3 of the heat diffuser 2. Of course, equivalents remain possible in the type of heating members, in the type of fastening and/or holding elements allowing holding the heating members(s) in the housing 3 of the heater 1. In this example, the heating members are thermistors with a positive temperature coefficient but could be resistive tracks or similar elements fulfilling the same function.

As seen in FIG. 3, the heater 1 comprises at least one connection element 8 configured to connect the heating member(s) 5 to an electronic board 9, said electronic board 9 being configured to control the heating member(s) 5.

In the example illustrated in FIG. 1, the heat diffuser 2 comprises a plurality of diffusion fins 4 arranged on the first portion 2a of the heat diffuser 2.

Figure 6A:
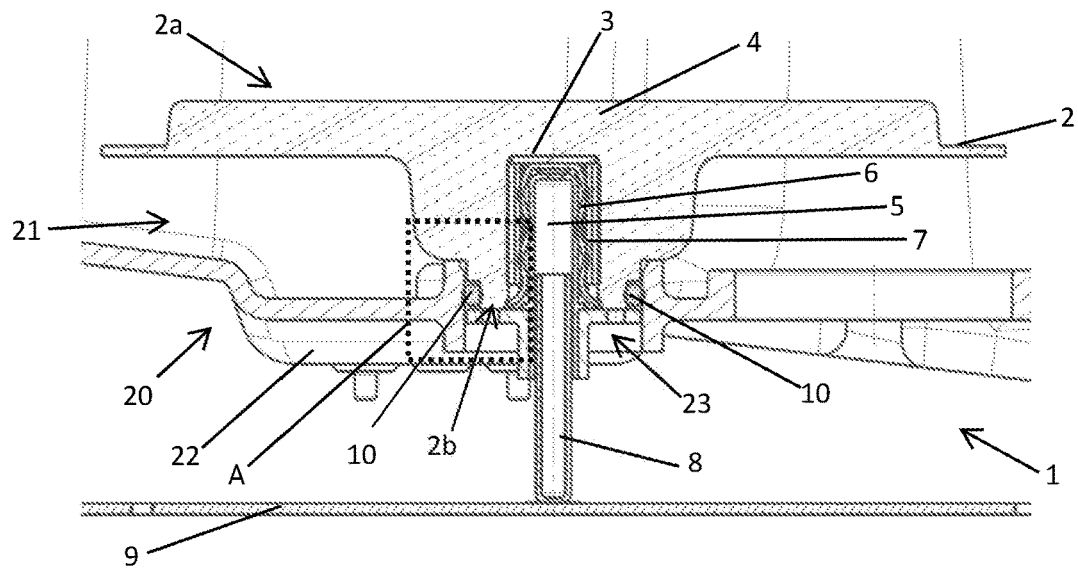
FIG. 6A is a detailed sectional view of the tank according to the invention and comprising a heater according to the invention.

As seen in FIG. 6A, the housing 3 of the heat diffuser 2 provided for the one or more heating member(s) 5 extends transversely between the first portion 2a of the heat diffuser 2 and the second portion 2b of the heat diffuser 2. Alternatively represented in FIG. 5, the housing 3 of the heater 1 extends under the heat diffuser 2 at the second portion 2b of said heat diffuser 2 and preferably along the second portion 2b of the heat diffuser 2 so that the housing 3 and the one or more heating member(s) 5 housed in said housing 3 are never in the area called wet area of the tank, even partially.

Figure 7:
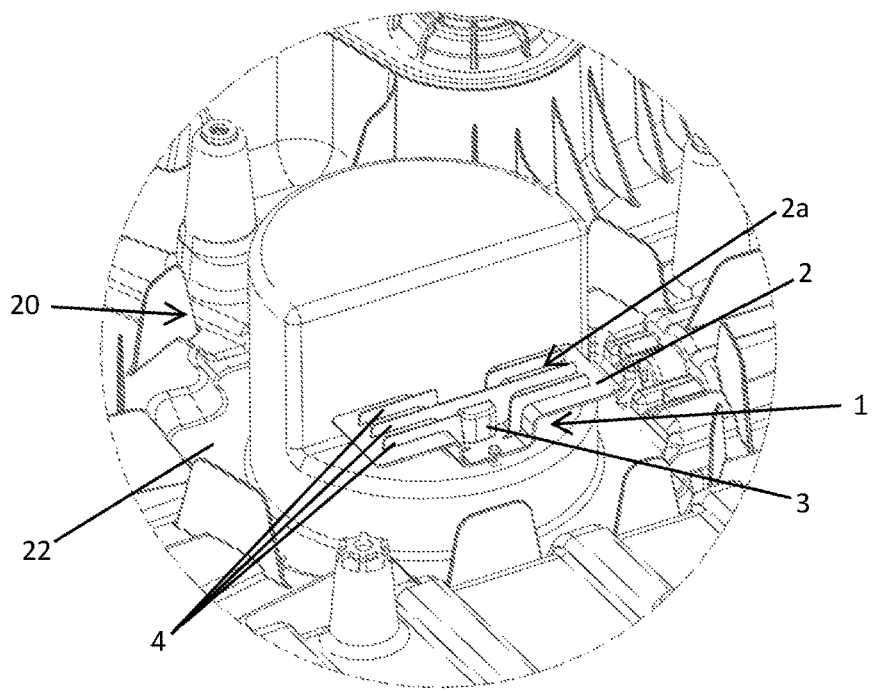
FIG. 7 is a partial perspective view of the interior of an aqueous urea solution tank equipped with a heater according to the invention.

FIGS. 6A and 7 partially show an aqueous urea solution tank 20 according to the invention in cross section. The tank 20 according to the invention comprises an internal volume 21 intended to contain an aqueous urea solution, said internal volume 21 being delimited by at least an upper wall (not shown), a bottom wall 22 and a side wall (not shown) connecting the upper wall and the lower wall 22.

The tank 20 further comprises a heater 1 according to the invention, said heater 1 being preferably positioned on the bottom wall 22 of the tank 20 or at least close to the latter as illustrated in FIG. 7. More particularly, as illustrated in FIG. 6, the first portion 2a of the heat diffuser 1 being arranged in the internal volume 21 of the tank 20. In addition, the second portion 2b of the heat diffuser 2 is arranged at least partially outside the tank 20. The tank 20 comprises a positioning orifice 23 shaped to allow the arrangement of the heater 1 in part in the internal volume 21 of said tank 20 and in part out of the tank 20.

Figure 6B:
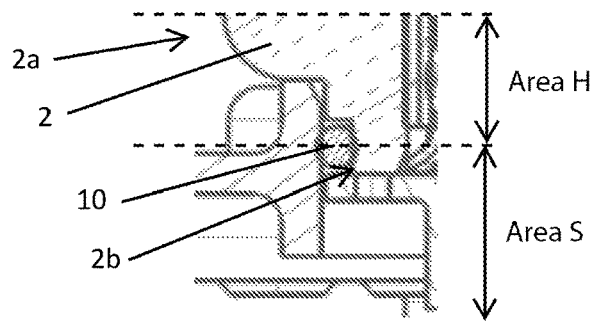
FIG. 6B is a detailed view according to box A of FIG. 6A.

As seen in FIG. 6A, the tank 20 comprises a seal 10 arranged at the positioning orifice 23 so that the second portion 2b of the heat diffuser 1 is not in contact with the aqueous area solution contained in the tank 20. In addition, the connection element 8 of the heater 1 is protruding from the tank 20 and allows connecting the electronic board 9, which is arranged out of the tank 20 with the heating member 5, housed in the housing 3 of the heat diffuser 2. Alternatively, the connector element 8 may be not protruding or may be protruding from the electronic board 9 and not from the heater. FIG. 6B illustrates in detail the separation between the wet area referenced area H in FIG. 6B and the dry area referenced area S in FIG. 6B. The seal 10 separates the two areas.

The present invention is here explained with reference to an application in a system for storing an aqueous urea solution, but could be applied to any corrosive fluid storage system for metals requiring a thawing.

Of course, the invention is not limited to the embodiments described and shown in the appended figures. Modifications remain possible, in particular from the point of view of the constitution of the various elements or by substitution of technical equivalents, without departing from the field of protection of the invention.

The invention claimed is:

1. A heater of a corrosive fluid for metals comprising:
   at least one heat diffuser having at least a first portion configured to be immersed in a corrosive fluid for metals, and at least a second portion configured to be arranged out of the corrosive fluid, the first portion of the diffuser being made of anodized aluminum or of anodized aluminum alloy and being configured to be in direct contact with the corrosive fluid, and at least one heating block comprising at least one heater element configured to heat the corrosive fluid, said heat diffuser comprising at least one housing in which the at least one heating block is housed at least partially, the at least one housing being configured to be between the at least one heater element and the corrosive fluid, and a surface of the second portion of the diffuser facing away from the at least one housing being shielded from contact with the corrosive fluid.

2. The heater according to claim 1, wherein the second portion of the diffuser is at least partially non-anodized.

3. The heater according to claim 1, wherein the heating block is in direct contact with the housing of the heat diffuser.

4. The heater according to claim 1, wherein the housing of the heat diffuser extends transversely between the first portion of the heat diffuser and the second portion of the heat diffuser.

5. The heater according to claim 1, wherein the corrosive fluid is a reduction solution.

6. The heater according to claim 5, wherein the reduction solution is an aqueous urea solution.

7. A tank of a corrosive fluid for metals, the tank comprising:
an internal volume configured to contain a corrosive fluid for metals, said internal volume being delimited by at least an upper wall, a lower wall and a lateral wall connecting the upper wall and the lower wall; and
a heater comprising:
at least one heat diffuser having at least a first portion configured to be immersed in a corrosive fluid for metals, and at least a second portion configured to be arranged out of the corrosive fluid, the first portion of the diffuser being made of anodized aluminum or of anodized aluminum alloy and being configured to be in direct contact with the corrosive fluid, and at least one heating block comprising at least one heater element configured to heat the corrosive fluid, said heat diffuser comprising at least one housing in which the at least one heating block is housed at least partially, the at least one housing being configured to be between the at least one heater element and the corrosive fluid, and a surface of the second portion of the diffuser facing away from the at least one housing being shielded from contact with the corrosive fluid;

said heater being positioned on one of the walls of the tank, the first portion of the heat diffuser of the heater being arranged in the internal volume of the tank.

8. The tank according to claim 7, further comprising a positioning orifice shaped to allow the arrangement of the heater in part in the internal volume of said tank and in part out of the tank.

9. The tank according to claim 8, further comprising a seal provided at the positioning orifice, said seal being formed in a secured manner to said positioning orifice of the tank or said seal being formed in an independent manner from said positioning orifice of the tank.

10. The tank according to claim 8, wherein the heater further comprises a seal arranged at the positioning orifice of the tank, said seal being formed in a secured manner to said heater or said seal being formed in an independent manner from said heater.

11. The tank according to claim 7, wherein the corrosive fluid is a reduction solution.

12. The tank according to claim 11, wherein the reduction solution is an aqueous urea solution.

13. A method for manufacturing a heat diffuser of a heater comprising:
at least one heat diffuser having at least a first portion configured to be immersed in a corrosive fluid for metals, and at least a second portion configured to be arranged out of the corrosive fluid, and
at least one heating block comprising at least one heater element configured to heat the corrosive fluid, said heat diffuser comprising at least one housing in which the at least one heating block is housed at least partially, the at least one housing being configured to be between the at least one heater element and the corrosive fluid, and a surface of the second portion of the diffuser facing away from the at least one housing being shielded from contact with the corrosive fluid;
said method comprising a step of making the heat diffuser in an aluminum or aluminum alloy type material and a step of anodizing at least a first portion of said heat diffuser, said first portion being configured to be immersed in the corrosive fluid.

14. The method according to claim 13, further comprising clogging the heat diffuser after the anodizing step.

15. The method according to claim 13, wherein the corrosive fluid is a reduction solution.

16. The method according to claim 15, wherein the reduction solution is an aqueous urea solution.

* * * * *